United States Patent
Zhang (10) Patent No.: US 9,658,794 B2
(45) Date of Patent: May 23, 2017

(54) TWO STAGE MEMORY ALLOCATION USING A CACHE

(71) Applicant: Dell Software Inc., Round Rock, TX (US)

(72) Inventor: Xiangyang Zhang, San Jose, CA (US)

(73) Assignee: SONICWALL INC., Santa Clara, CA (US)

( * ) Notice: Subject to any disclaimer, the term of this patent is extended or adjusted under 35 U.S.C. 154(b) by 184 days.

(21) Appl. No.: 14/708,110

(22) Filed: May 8, 2015

(65) Prior Publication Data

US 2016/0328175 A1 Nov. 10, 2016

(51) Int. Cl.
*G06F 13/00* (2006.01)
*G06F 3/06* (2006.01)

(52) U.S. Cl.
CPC .......... *G06F 3/0644* (2013.01); *G06F 3/0604* (2013.01); *G06F 3/0631* (2013.01); *G06F 3/0673* (2013.01)

(58) Field of Classification Search
CPC .............................. G06F 12/14; G06F 12/1441
USPC .......................................................... 711/163
See application file for complete search history.

(56) References Cited

U.S. PATENT DOCUMENTS

| | | | |
|---|---|---|---|
| 6,584,554 B1 * | 6/2003 | Dahlen | G06F 3/0601 711/130 |
| 6,594,667 B2 * | 7/2003 | Dahlen | G06F 17/30312 |
| 7,246,187 B1 * | 7/2007 | Ezra | G06F 9/526 710/200 |
| 7,472,233 B2 * | 12/2008 | McKenney | G06F 9/5016 711/147 |
| 2003/0041173 A1 * | 2/2003 | Hoyle | G06F 9/526 709/248 |
| 2003/0236957 A1 * | 12/2003 | Miller | G06F 12/0813 711/163 |
| 2004/0225742 A1 * | 11/2004 | Loaiza | G06F 9/526 709/229 |
| 2006/0117316 A1 * | 6/2006 | Cismas | G06F 9/3851 718/103 |
| 2007/0150665 A1 * | 6/2007 | Arimilli | G06F 9/526 711/145 |
| 2008/0320262 A1 * | 12/2008 | McKenney | G06F 9/52 711/163 |
| 2010/0275216 A1 * | 10/2010 | Crowell | G06F 9/526 718/106 |
| 2012/0089735 A1 * | 4/2012 | Attaluri | G06F 9/526 709/226 |

(Continued)

OTHER PUBLICATIONS

U.S. Appl. No. 14/695,681, William J. Romine, Partitioning Target Data to Improve Data Replication Performance, filed Apr. 24, 2015.

*Primary Examiner* — Sean D Rossiter
(74) *Attorney, Agent, or Firm* — Polsinelli LLP (57) ABSTRACT

The presently claimed invention manages memory in a multi-processor system. The presently claimed invention may use a combination of global and local locks when allocating memory and de-allocating memory in a multi-processor system. A method consistent with the presently claimed invention may first receive an allocation of a first memory space in the system memory of a multi-core processing system. The allocation of the first memory space may globally locks the first memory space where the memory space may administered by a software module using one or more local locks.

21 Claims, 7 Drawing Sheets

(56) References Cited

U.S. PATENT DOCUMENTS

| | | | |
|---|---|---|---|
| 2012/0311606 A1* | 12/2012 | Marathe | G06F 9/526 718/107 |
| 2014/0244943 A1* | 8/2014 | Jacobs | G06F 12/0815 711/141 |
| 2016/0132364 A1* | 5/2016 | Huang | G06F 17/30362 710/200 |
| 2016/0314147 A1 | 10/2016 | Romine | |

\* cited by examiner

TWO STAGE MEMORY ALLOCATION USING A CACHE

BACKGROUND OF THE INVENTION

Field of the Invention

The presently claimed invention is generally related to a managing memory in a multi-processor system. More specifically the presently claimed invention is related to allocating a range of memory addresses to a software process in a computer system.

Description of the Related Art

Conventionally memory that is allocated to a first process running on a computer system must be locked such that another process running on the computer does not overwrite the memory allocated to the first process before the first process has released the lock on the allocated memory. These types of locks are commonly referred to as spin locks. In certain instances when a thread corresponding to process has created a spin lock, the lock may persist longer than the process really needs the spin lock. This is because the period of time that a spin lock is held is not only dependent upon how long a process uses the allocated memory. The period of time that a spin lock is held may also correspond to factors, such as, the number of threads running on the computer system, the architecture and complexity of the memory allocation scheme running at the computer system, and the number of cores in the computer system.

When there are many threads running in a computer system, especially when the computer system includes one or more multi-core processors, the unlocking of memory corresponding to a particular process may be delayed significantly. Delays in releasing spin locks decreases the efficiency of processes running on the computer system. These delays waste the compute cycles in the computer system because a process may have to wait for memory to become available for a thread related to that process to execute code at a processor in the computer system. Current memory allocation schemes, thus, reduce memory allocation efficiency by blocking threads from receiving access to memory quickly after another process has completed using the memory. In certain instances these delays have been known to the system software or a program running on a computer system to abruptly stop functioning (i.e. crash).

What is needed is a system and a method that allows a process to use memory without waiting for a conventional spin lock to be released.

SUMMARY OF THE PRESENTLY CLAIMED INVENTION

The presently claimed invention manages memory in a multi-processor system. Initially a part of memory is allocated to a program with a global lock. The program may then locally lock a portion of the globally locked memory for use by another software process. After providing the local lock, the program may then store a starting address of the locally locked portion of memory in a data structure.

An embodiment of the presently claimed invention may be implemented as a software program (i.e.: a non-transitory computer readable storage medium). The software program may globally lock a first memory space of system memory of a multi-core system. The software program may then receive a first request to locally lock a first portion of the first memory space where the first memory space is of a size that corresponds to a memory size that spans a range of memory addresses from a first starting memory address. The software program may then lock the first portion of memory with a first local lock that includes memory addresses in the first memory space. Next the software program may store the first starting memory address in a first entry of a data structure.

An apparatus of the presently claimed invention may be any computing device that requires memory to be allocated to a processor. The apparatus includes a memory and multiple processors. At least one of the processors executes instructions out of the memory thereby receiving a first allocation of a first memory space of system memory of the multi-core processing system. The first allocation of the first memory space globally locks the first memory space. A first request for locally locking a first portion of memory is also received and the first portion of memory is of a size that corresponds to a memory size that spans a range of memory addresses from a first starting memory address. Execution of the instructions locks the first portion of memory with a first local lock and includes memory addresses in the first memory space. Execution of the instructions also stores the first starting memory address in a first entry of a data structure.

DETAILED DESCRIPTION

The presently claimed invention manages memory in a multi-processor system. The presently claimed invention may use a combination of global and local locks when allocating memory and de-allocating memory in a multi-processor system. After locking allocating and globally locking a portion of system memory, parts of the allocated memory may be allocated to processes running on one or more processors at the multi-processor system using a series of local locks.

The presently claimed invention may globally lock a portion of system memory dynamically at any time, or may globally lock a portion of system memory when the system boots up. When the portion of system memory is allocated at boot time or shortly after boot time, the allocated system memory may be may be maintained for as long as the system is operating. Such an allocated portion of system memory may be referred to as a persistent object because it may persist from boot time until the system is shutdown.

In instances where a portion of system memory of system memory is allocated dynamically, the allocated system memory may be referred to as a temporary (transient) object that may be maintained for as long as it is needed. In these instances the dynamically allocated memory may be released (unlocked globally) when an application program no longer needs the dynamically allocated memory.

The presently claimed invention may also use both a persistent object and a temporary object. This may occur when the memory locations of the persistent memory object are fully utilized and when an application requires additional memory. The presently claimed invention may expand and shrink a total amount of system memory that is allocated to software module and made available to an application program.

Memory locked by a global lock according to the presently claimed invention may not be accessed by other application programs or nodes executing applications not related to a specific type of application that may interact with a software module of the presently claimed invention. The software module may quickly allocate and de-allocated memory using local locks managed by the software module without accessing or waiting for a global memory manager. The presently claimed invention by operating with both global and local locks increases the efficiency of memory allocation to an application program.

Application programs that receive local locks from the software module may receive access to a block of memory in the globally locked portion of system memory where each block allocated may be of the same size (i.e. a set homogeneous memory blocks). The presently claimed invention operates most efficiently when allocating memory using local locks that lock blocks of memory of the same size. When the blocks of memory are the same size, a data structure that maps a process or thread to a specific memory location does not need to track data blocks of different sizes. The presently claimed invention optimizes the execution speed of application programs that store data blocks of the same size. Examples of such application programs include applications that manage: data packets, a secure socket layer session, an endpoint of an Internet protocol security (IPSec) tunnel, network address translation objects, policies or data for a dynamic firewall, and a session in a firewall (such as a state-full firewall session).

The presently claimed invention may manage memory allocation for one or more different types of applications by using one or more software modules consistent with the presently claimed invention. Each different application program may be allocated blocks of memory of a size that corresponds to a size used by each respective different application program.

In certain instances persistent and temporary objects of the presently claimed invention may be maintained in an object list that groups free objects, groups used objects, identifies a minimum number of objects, and that identifies a maximum number of objects. The minimum number of objects may correspond to a minimum set of persistent objects that are initialized at boot time. The maximum number of objects may limit a total number of persistent and transient objects that may exist in system memory at a point in time.

Objects of the presently claimed invention may create or destroy an object cache, may allocate an object to an application program process or thread, or that may free an object. Freeing an object may consist of disassociating the application program process or thread from the memory object, such that another application program process or thread may be associated with the object.

Figure 1:
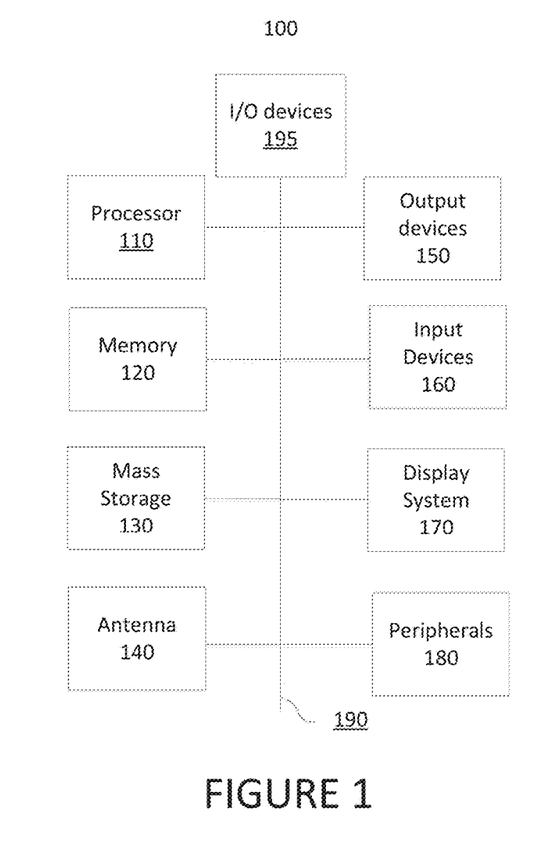
FIG. 1 illustrates a block diagram of a computing device that may be used to implement various embodiments of the presently claimed invention.

FIG. 1 illustrates a block diagram of a computing device that may be used to implement various embodiments of the presently claimed invention. FIG. 1 illustrates an exemplary computing system 100 that may be used to implement a computing device with the present technology. Note that FIG. 1 is exemplary and that all features shown in the figure may not be included in a system implementing the presently claimed invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the presently claimed invention for purposes of loading that software into main memory 120. The system software for implementing embodiments of the presently claimed invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the presently claimed invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the presently claimed invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

Figure 2:
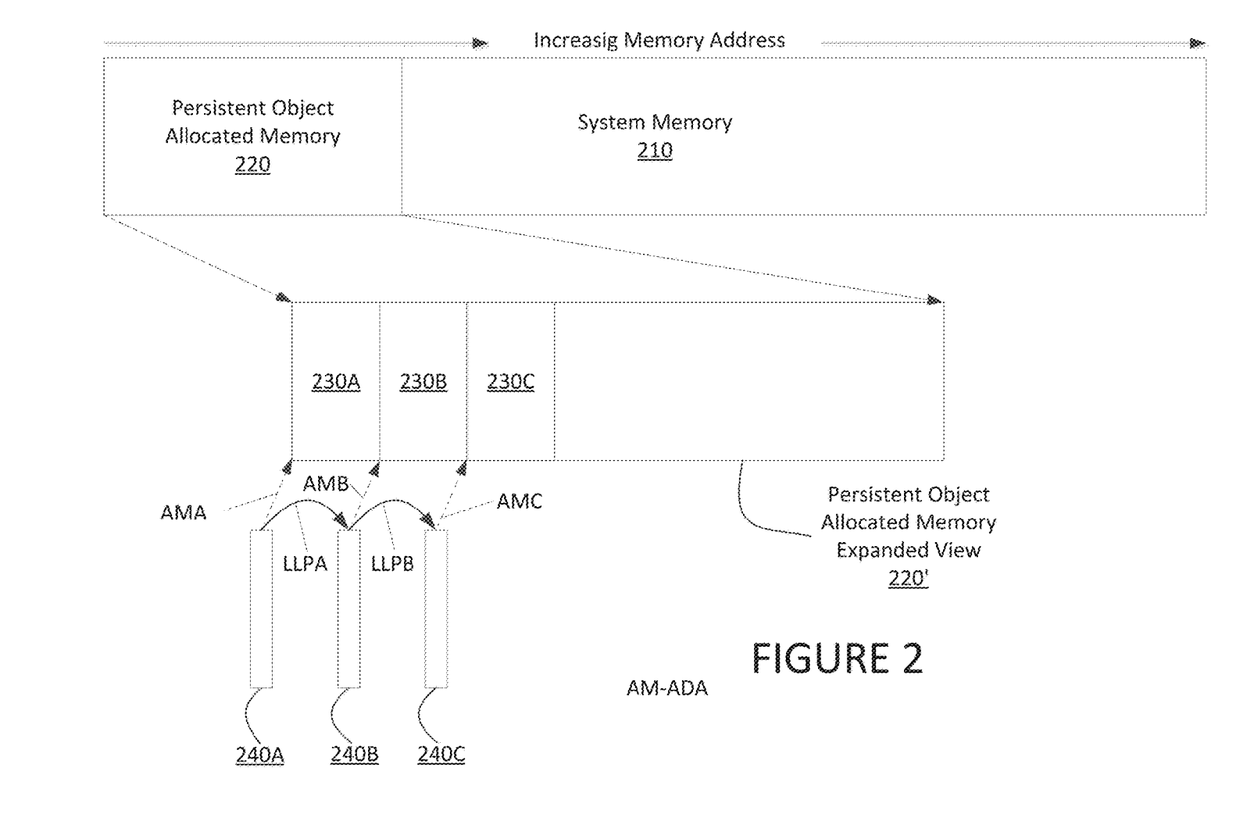
FIG. 2 illustrates a portion of system memory allocated to a persistent memory object.

FIG. 2 illustrates a portion of system memory allocated to a persistent memory object. FIG. 2 includes system memory 210 where a portion of the system memory 210 is allocated to persistent memory object 220. FIG. 2 also includes an expanded view 220' of the persistent memory object. The expanded view 220' of the persistent memory object includes allocated memory blocks 230A, 230B, and 230C. Memory blocks 230A, 230B, and 230C may store data that is associated with an application program. Each memory block 230A, 230B, and 230C may consist of a one or more memory locations in the system memory. When the memory blocks include more than one individual memory location a first memory location may reside at a starting memory address and end at a second memory address. The size of each memory block 230A, 230B, and 230C may be equal.

FIG. 2 also includes elements 240A, 240B, and 240C that may be stored in a data structure. Element 240A includes a first allocated memory address AMA and a pointer LLPA that points to a second element 240B. Element 240B includes a second allocated memory address AMB and a pointer LLPB that points to a third element 240C. Element 240C includes a third allocated memory address AMC. The allocated memory address pointers AMA, AMB, and AMC each point to a starting memory address of memory blocks 230A, 230B, and 230C respectively. The data structure storing memory elements 240A, 240B, and 240C may be a linked list. Whenever a process associated with an application program requests an additional memory block that memory block may be allocated by a software module by locally locking an additional memory block according to the presently claimed invention. The software module may then update the data structure after the process requests the additional memory block. The software module may also de-allocate a memory block by unlocking a local lock and by removing an entry from the data structure. Data structures used with embodiments of the presently claimed invention include, yet are not limited to linked lists, and hash tables.

Figure 3:
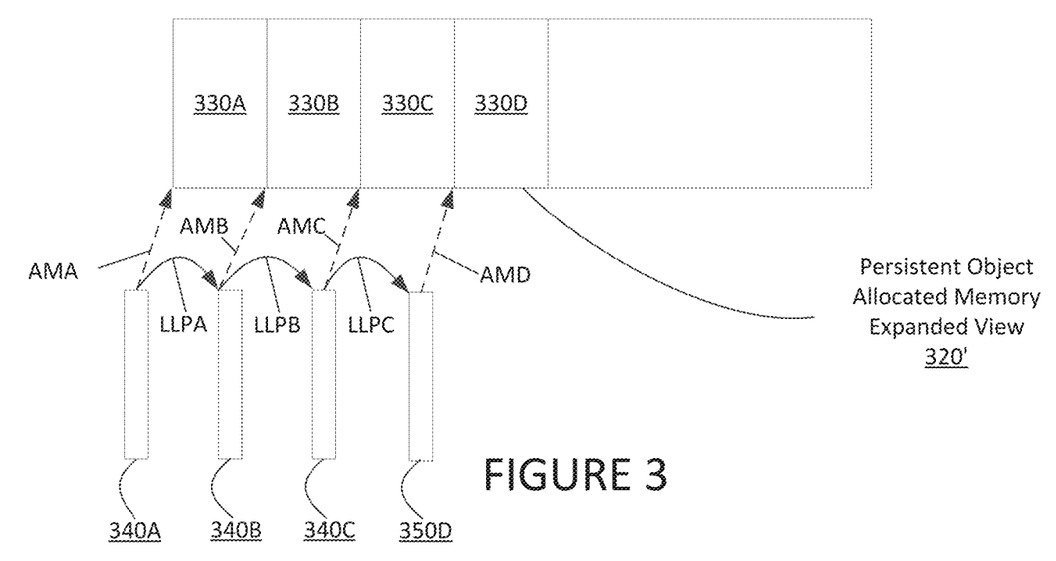
FIG. 3 illustrates an exemplary expanded view of the persistent memory object of FIG. 2 after another element has been added to the data structure of FIG. 2.

FIG. 3 illustrates an exemplary expanded view of the persistent memory object of FIG. 2 after another element has been added to the data structure of FIG. 2. The expanded view 320' of the persistent memory object in FIG. 3 includes four allocated data blocks 330A, 330B, 330C, and 330D where FIG. 2 includes only three. Element 340A includes a first allocated memory address AMA and a pointer LLPA that points to a second element 340B. Element 340B includes a second allocated memory address AMB and a pointer LLPB that points to a third element 340C. Element 340C includes a third allocated memory address AMC and a pointer LLPC that points to a fourth element 340D. Element 340D includes a third allocated memory address AMD. The allocated memory address pointers AMA, AMB, AMC, and AMD each point to a starting memory address of memory blocks 330A, 330B, 330C, and 330D respectively.

Figure 4:
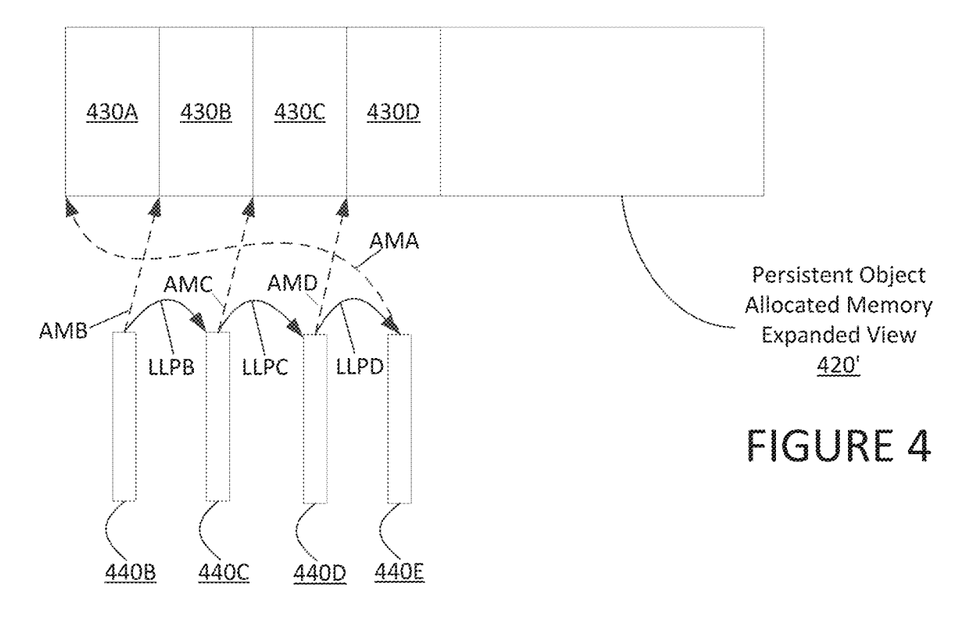
FIG. 4 illustrates an expanded view of the persistent object of FIG. 2 after an element has been removed and another element added to the data structure of FIG. 2.

FIG. 4 illustrates an expanded view of the persistent object of FIG. 2 after an element has been removed and another element added to the data structure of FIG. 2. The expanded view 420' of the persistent memory object includes four allocated data blocks 430A, 430B, 430C, and 430D. Notice that element 440E includes a first allocated memory address AMA. Element 440B includes a second allocated memory address AMB and a pointer LLPB that points to a third element 440C. Element 440C includes a third allocated memory address AMC and a pointer LLPC that points to a fourth element 440D. Element 440D includes a third allocated memory address AMD and a pointer that points to the fourth element 440E of the data structure of FIG. 4. The allocated memory address pointers AMA, AMB, AMC, and AMD each point to a starting memory address of memory blocks 430A, 430B, 430C, and 430D respectively. FIG. 4 illustrates that the presently claimed invention may allocate a data block (i.e. 430A) to an application program that was previously locked and then unlocked by a local lock.

Figure 5:
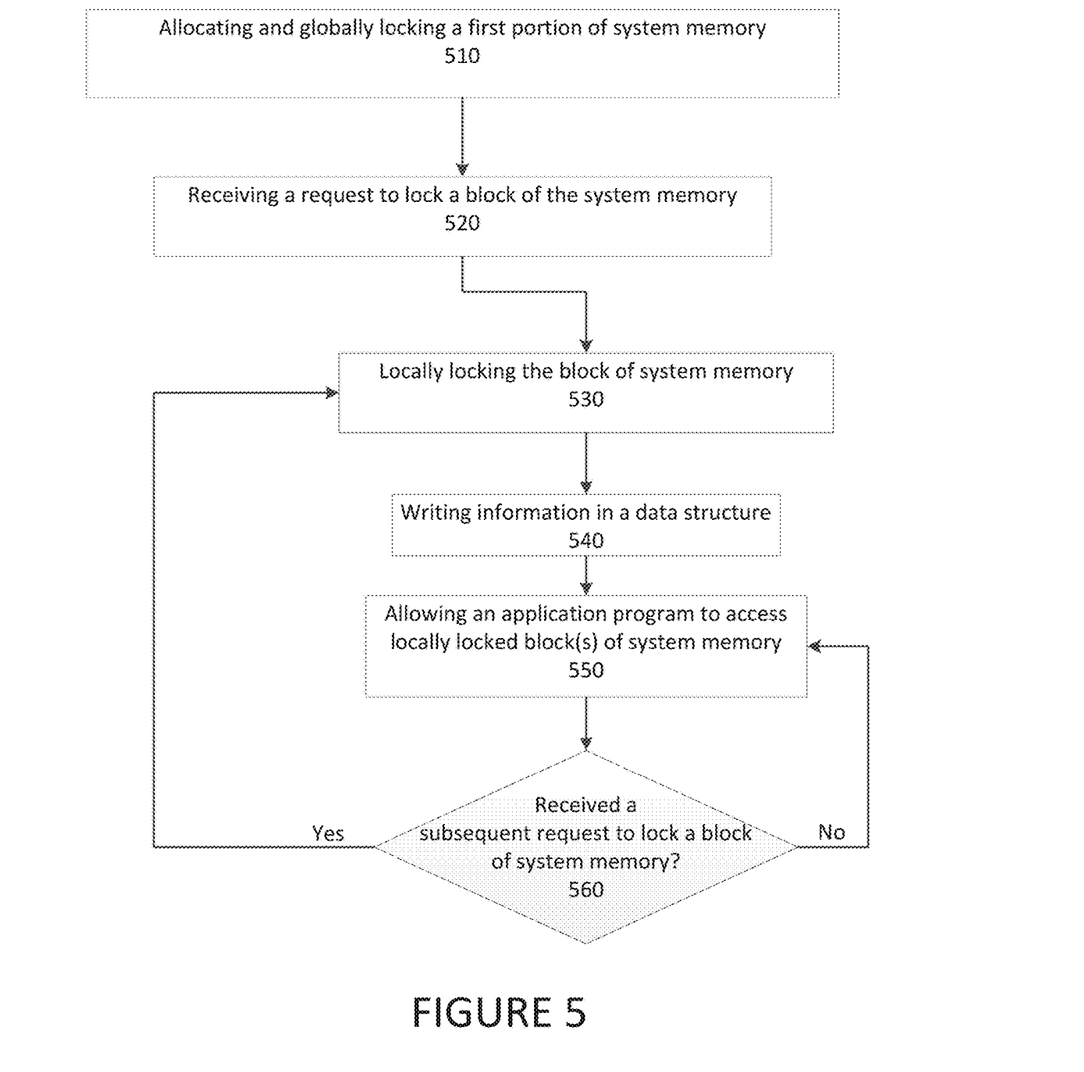
FIG. 5 illustrates a flow chart of an exemplary software module consistent with the presently claimed invention.

FIG. 5 illustrates a flow chart of an exemplary software module consistent with the presently claimed invention. The flow chart of FIG. 5 begins with step 510 where a portion of system memory may be allocated by globally locking the portion of system memory. Then in step 520 a request to lock a block of the system memory is received. Next in step 530 the block of system memory is locally locked by the software module. In step 540 software module may create or update a data structure by writing information into the data structure. Step 550 of the flow chart allows an application program to access the locally locked block(s) of system memory that have been allocated to the application.

Step 560 of FIG. 5 is a determining step that identifies whether a subsequent request to lock a memory block has been received by the software module. When a subsequent request has been received in step 560, program flow moves back to step 530 where an additional block of system memory may be locally locked. When the subsequent request has not been received in step 560, program flow moves back to step 550 where the application may access the locally locked blocks of system memory.

Figure 6:
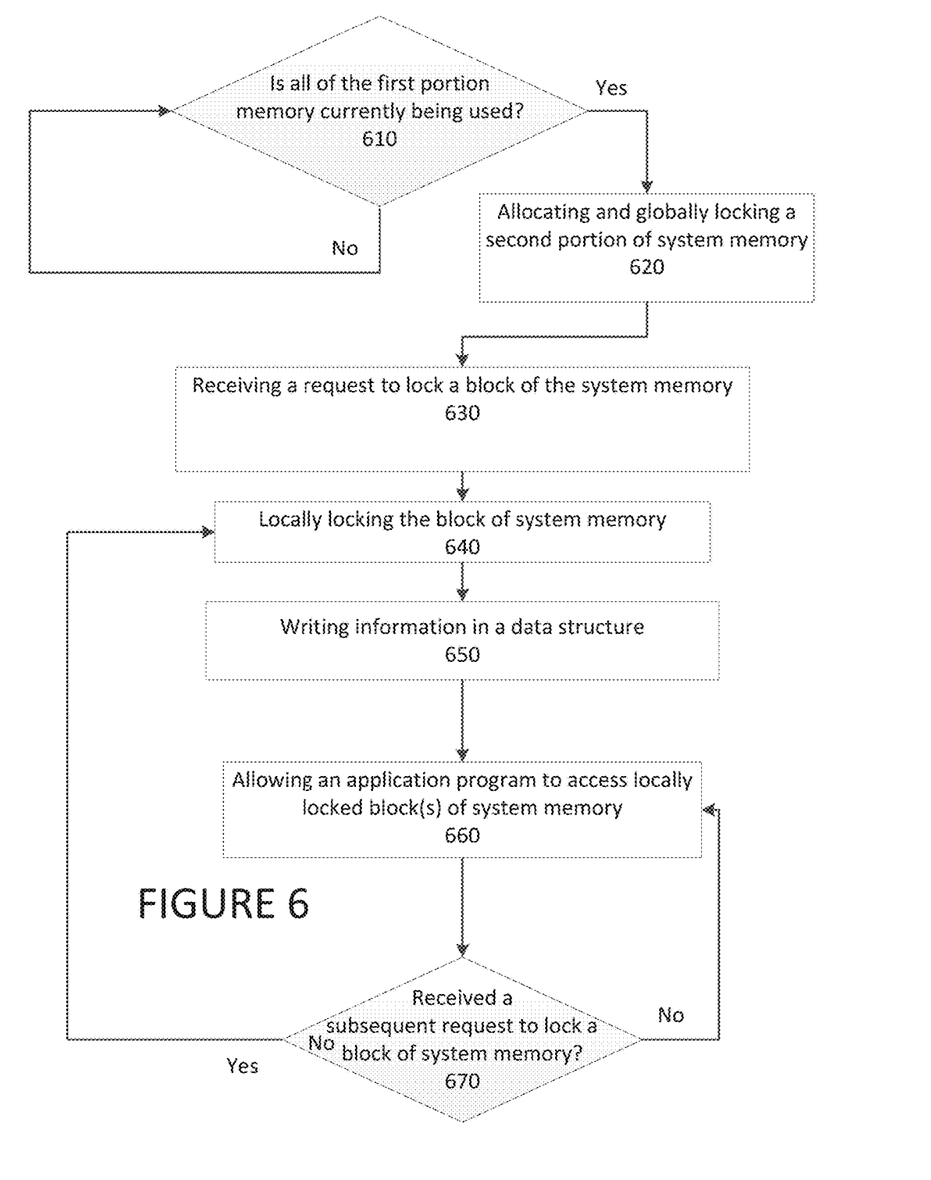
FIG. 6 illustrates a second flow chart of a software module according to the presently claimed invention.

FIG. 6 illustrates a second flow chart of a software module according to the presently claimed invention. Step 610 of FIG. 6 determines whether all of the memory in the first portion of memory allocated in the first step of FIG. 5 are currently being used, when no, program flow remains in step 610. When all of the memory in the first portion of memory are currently being used, program flow moves to step 620. Step 620 allocates and globally locks a second portion of the system memory.

Next in step 630 a request is received from an application program to lock a block of the system memory. Then in step 640 the block of system memory is locally locked by the software module. In step 650 software module may create or update a data structure by writing information into the data structure. Step 660 of the flow chart allows an application program to access the locally locked block(s) of system memory that have been allocated to the application.

Step 670 of FIG. 6 is a determining step that identifies whether a subsequent request to lock a memory block has been received by the software module. When a subsequent request has been received in step 670, program flow moves back to step 640 where an additional block of system memory may be locally locked. When the subsequent request has not been received in step 670, program flow moves back to step 660 where the application may access the locally locked blocks of system memory.

Figure 7:
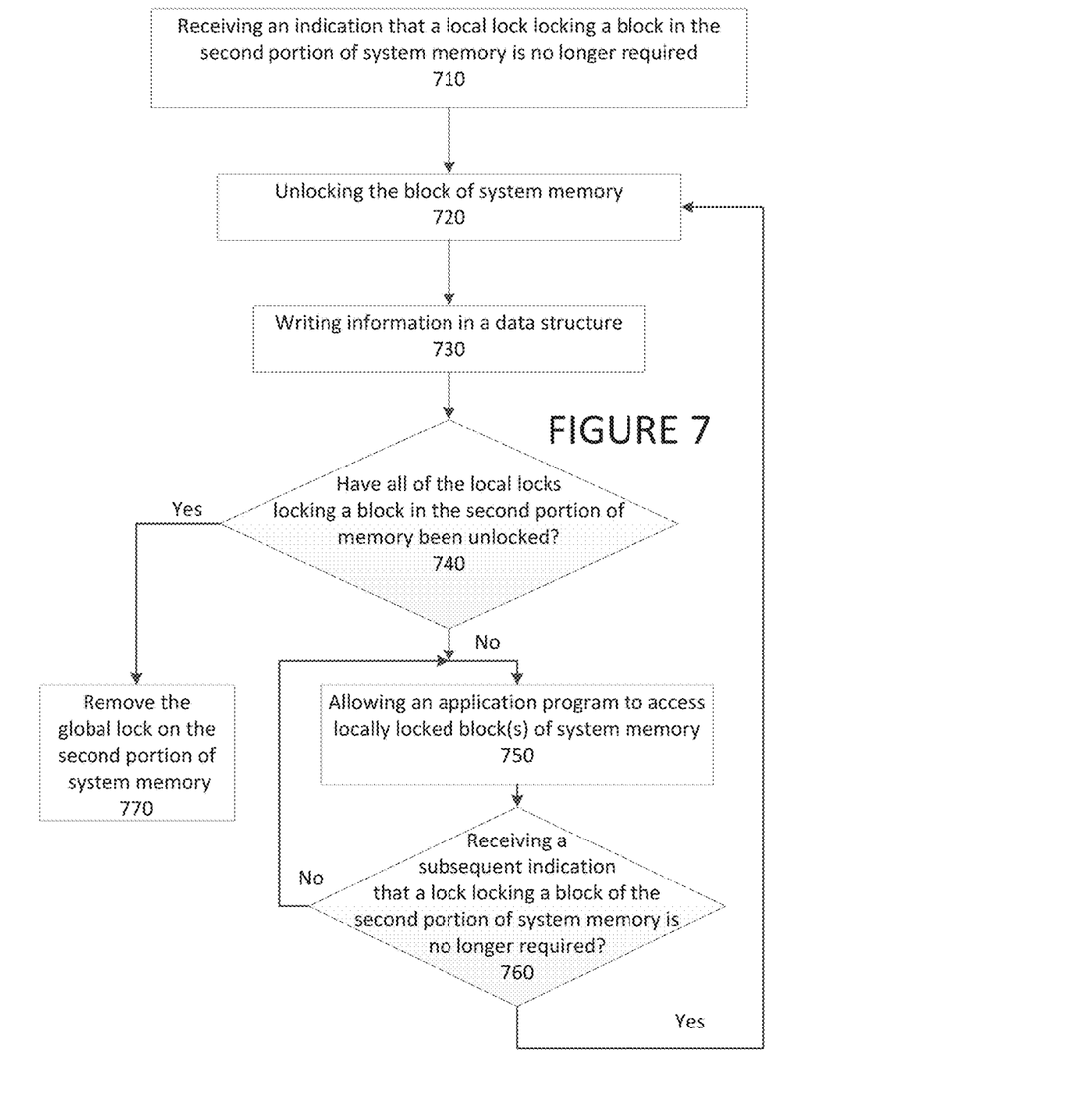
FIG. 7 illustrates a third flow chart of a software module according to the presently claimed invention.

FIG. 7 illustrates a third flow chart of a software module according to the presently claimed invention. Step 710 of the flow chart of FIG. 7 receives an indication that a local lock locking a block in the second portion of system memory is no longer required. Then in step 720 the block that is no longer required is unlocked. Next in step 730 information is written to a data structure that removes reference to the unlocked block.

Step 740 is a determination step that determines whether all local locks locking memory in the second potion of memory have been removed, when yes, program flow moves to step 770 where a global lock locking the second portion of system memory is removed. When step 740 determines that all of the locks locking memory in the second potion of memory have not been removed program flow moves to step 750 where an application program is allowed to access the locally locked blocks of system memory. Then in step 760 determines whether a subsequent indication that a lock locking a block of the second portion of system memory is no longer required, when yes, program flow moves back to step 720 where the lock is unlocked. When an indication that a lock of the second portion of system memory has not been received, program flow moves back to step 750 where the application program may access the locally locked blocks of system memory. FIGS. 6 and 7 illustrate that when a first portion of system memory is fully utilized, a second portion of system memory may be allocated and administered as long as an application program requires additional memory. When the second portion of system memory is no longer required, a global lock locking the second portion of system memory may be removed.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description are not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A method for allocating memory on a multi-core processing system, the method comprising:
   receiving a first allocation of a first memory space of system memory of the multi-core processing system at a first software module, wherein the first allocation of the first memory space globally locks the first memory space;
   receiving a first request for locally locking a first portion of memory, wherein the first portion of memory is of a size that corresponds to a memory size that spans a range of memory addresses from a first starting memory address;
   locking the first portion of memory with a first local lock, wherein the first portion of memory includes memory addresses in the first memory space; and
   storing the first starting memory address in a first entry of a data structure.

2. The method of claim 1, further comprising:
   receiving a second request for locally locking a second portion of memory, wherein the second portion of memory corresponds to the size of the first portion of memory that spans a range of memory addresses from a second starting memory address;
   locking the second portion of memory with a second local lock, wherein the second portion of memory includes memory addresses in the second memory space;
   storing the second starting memory address in a second entry in the data structure;
   receiving a third request for locally locking a third portion of memory, wherein the third portion of memory corresponds to the size of the first portion of memory that spans a range of memory addresses from a third starting memory address,
   locking the third portion of memory with a third local lock, wherein the third portion of memory includes memory addresses in the third memory space; and
   storing the third starting memory address in a third entry in the data structure.

3. The method of claim 2, wherein:
   the first entry in the data structure includes a pointer to the first starting memory address;
   the second entry in the data structure includes a pointer to the second starting memory address; and
   the third entry in the data structure includes a pointer to the third starting memory address.

4. The method of claim 2, wherein:
   the first portion of memory is exclusively accessed by a first thread executed by one or more processors at the multi-core processor;
   the second portion of memory is exclusively accessed by a second thread executed by one or more processors at the multi-core processor; and
   the third portion of memory is exclusively accessed by a third thread executed by one or more processors at the multi-core processor.

5. The method of claim 3, further comprising:
   receiving an indication that identifies the first local lock, the second local lock, or the third local lock is no longer required;
   unlocking the local lock identified by the indication; and
   deleting an entry in the data structure identified by the indication.

6. The method of claim 3, wherein:
   the data structure is a linked list,
   the first entry in the data structure includes a pointer to the second entry in the data structure; and
   the second entry in the data structure includes a pointer to the third entry in the data structure.

7. The method of claim 3, further comprising:
   receiving an allocation of a second memory space of the system memory of the computer system at the first software module, wherein the allocation of the second memory space globally locks the second memory space; and
   receiving a fourth request for locally locking a portion of memory, wherein the size of the fourth portion of memory corresponds to the size of the first portion of memory that spans a range of memory addresses from a fourth starting memory address.

8. The method of claim 7, further comprising:
   receiving an indication that the fourth local lock is no longer required;

unlocking the local lock associated with the fourth local lock; and unlocking the global lock locking the second memory space of the system memory.

9. The method of claim 2, wherein the size of the first, the second, and the third portions of memory are equal and correspond to a size of memory relating to a process performed by an application program executed by one or more cores of the multi-core processor.

10. The method of claim 9, wherein the application program process corresponds to at least one of storing data packets, a secure socket layer session, managing an endpoint of an Internet protocol security tunnel, network address translation object management, dynamic firewall policy management, and managing a session in a firewall.

11. A non-transitory computer readable storage medium having embodied thereon a program executable by a processor for performing a method for allocating memory on a multi-core processing system, the method comprising:

receiving a first allocation of a first memory space of system memory of the multi-core processing system, wherein the first allocation of the first memory space globally locks the first memory space;

receiving a first request for locally locking a first portion of memory, wherein the first portion of memory is of a size that corresponds to a memory size that spans a range of memory addresses from a first starting memory address;

locking the first portion of memory with a first local lock, wherein the first portion of memory includes memory addresses in the first memory space; and storing the first starting memory address in a first entry in a data structure.

12. The non-transitory computer readable storage medium of claim 11, the program further executable to:

receive a second request for locally locking a second portion of memory, wherein the second portion of memory corresponds to the size of the first portion of memory that spans a range of memory addresses from a second starting memory address;

lock the second portion of memory with a second local lock, wherein the second portion of memory includes memory addresses in the second memory space;

store the second starting memory address in a second entry in the data structure;

receive a third request for locally locking a third portion of memory, wherein the third portion of memory corresponds to the size of the first portion of memory that spans a range of memory addresses from a third starting memory address, lock the third portion of memory with a third local lock, wherein the third portion of memory includes memory addresses in the third memory space; and store the third starting memory address in a third entry in the data structure.

13. The non-transitory computer readable storage medium of claim 12, wherein:

the first entry in the data structure includes a pointer to the first starting memory address;

the second entry in the data structure includes a pointer to the second starting memory address; and the third entry in the data structure includes a pointer to the third starting memory address.

14. The non-transitory computer readable storage medium of claim 12, wherein:

the first portion of memory is exclusively accessed by a first thread executed by one or more processors at the multi-core processor;

the second portion of memory is exclusively accessed by a second thread executed by one or more processors at the multi-core processor; and the third portion of memory is exclusively accessed by a third thread executed by one or more processors at the multi-core processor.

15. The non-transitory computer readable storage medium of claim 13, the program further executable to:

receive an indication that identifies the first local lock, the second local lock, or the third local lock is no longer required;

unlock the local lock identified by the indication; and delete an entry in the data structure identified by the indication.

16. The non-transitory computer readable storage medium of claim 13, wherein:

the data structure is a linked list, the first entry in the data structure includes a pointer to the second entry in the data structure; and the second entry in the data structure includes a pointer to the third entry in the data structure.

17. The non-transitory computer readable storage medium of claim 13, the program further executable to:

receive an allocation of a second memory space of the system memory of the computer system, wherein the allocation of the second memory space globally locks the second memory space; and receive a fourth request for locally locking a portion of memory, wherein the size of the fourth portion of memory corresponds to the size of the first portion of memory that spans a range of memory addresses from a fourth starting memory address.

18. The non-transitory computer readable storage medium of claim 17, the program further executable to:

receive an indication that a fourth local lock is no longer required;

unlock the local lock associated with the fourth local lock; and unlock the global lock locking the second memory space of the system memory.

19. The non-transitory computer readable storage medium of claim 12, wherein the size of the first, the second, and the third portions of memory are equal and correspond to a size of memory relating to a process performed by an application program executed by one or more cores of the multi-core processor.

20. The non-transitory computer readable storage medium of claim 19, wherein the application program process corresponds to at least one of storing data packets, a secure socket layer session, managing an endpoint of an Internet protocol security tunnel, network address translation object management, dynamic firewall policy management, and managing a session in a firewall.

21. An apparatus for allocating memory, the apparatus comprising:

a memory; and multiple processors, wherein at least one of the one or more multiple processors executes instructions out of the memory, wherein the at least one or more processors:

receives a first allocation of a first memory space of system memory of the multi-core processing system at a first software module, the first allocation of the first memory space globally locks the first memory space;

receives a first request for locally locking a first portion of memory, the first portion of memory is of a size that corresponds to a memory size that spans a range of memory addresses from a first starting memory address;

locks the first portion of memory with a first local lock, wherein the first portion of memory includes memory addresses in the first memory space; and stores the first starting memory address in a first entry of a data structure.

* * * * *